United States Patent [19]
Turner et al.

[11] Patent Number: 6,084,956
[45] Date of Patent: *Jul. 4, 2000

[54] SS7 MEDIATION FOR DATA NETWORK CALL SETUP AND SERVICES INTERWORKING

[75] Inventors: Douglas G. Turner, Gloucester, Canada; Richard E. Patchet, Allen, Tex.; Robert H. Holt; Charles C. Britney, both of Nepean, Canada

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,952

[22] Filed: Sep. 19, 1997

[51] Int. Cl.[7] .............................. H04M 7/00; H04M 3/42; H04L 12/66; H04J 3/22

[52] U.S. Cl. ..................... 379/230; 370/352; 370/467; 379/207; 379/220; 379/900; 379/901

[58] Field of Search ..................................... 379/207, 229, 379/230, 231, 265, 266, 201, 219, 220, 221, 900, 901; 370/352, 466, 467

[56] References Cited

U.S. PATENT DOCUMENTS

| | | | |
|---|---|---|---|
| 5,450,472 | 9/1995 | Brax | 455/557 |
| 5,463,683 | 10/1995 | Collins et al. | 379/207 |
| 5,610,910 | 3/1997 | Focsaneanu et al. | 370/351 |
| 5,633,924 | 5/1997 | Kaish et al. | 379/266 |
| 5,696,809 | 12/1997 | Voit | 379/266 |
| 5,742,675 | 4/1998 | Kilander et al. | 379/266 |
| 5,809,128 | 9/1998 | McMullin | 379/215 |
| 5,848,143 | 12/1998 | Andrews et al. | 379/265 |
| 5,850,391 | 12/1998 | Essigmann | 370/331 |
| 5,854,835 | 12/1998 | Montgomery et al. | 379/113 |

*Primary Examiner*—Harry S. Hong
*Attorney, Agent, or Firm*—Foley & Lardner

[57] ABSTRACT

In a data access transport service call setup from the Public Switched Telephony Network (PSTN) requires efficient utilization of PSTN resources and signalling infrastructure. A system is disclosed for interworking the PSTN Common Channel Signalling System Number 7 (CCS7) and Internet Protocol (IP) based data networks call setup protocols. The system provides efficient control of network-based signalling and control resources in support of PSTN originated IP-based data calls and services interworking between IP-based networks and other telecommunications networks. An architecture is provided allowing a flexible implementation and distribution of the interworking functions, including functional distribution between an CCS7 interworking function, network controller, Network Access Server, and existing telecommunications network interfaces.

19 Claims, 7 Drawing Sheets

SS7 MEDIATION FOR DATA NETWORK CALL SETUP AND SERVICES INTERWORKING

FIELD OF THE INVENTION

This invention relates generally to IP call setup from the Public Switched Telephony Network (PSTN) (or Integrated Services Digital Network) (ISDN) and, in particular, to a methodology for interworking the PSTN Common Channel Signalling System Number 7 (CCS7) and Internet Protocol (IP) based data networks.

BACKGROUND OF THE INVENTION

Users of computer networks such as "Internet" by way of Public Switched Telephone Networks (PSTN) are increasing in phenomenal numbers; the majority of users access "Internet" by dial-up telephone connection.

As taught in a related U.S. patent application Ser. No. 60/048,325, the entire specification of which is incorporated by reference, many problems in managing IP-based data service through PSTN access (PSTN switch congestion, such as need for increasing trunking resources, an increased modem pool management complexity, and a need for increasing number of ISP access lines) can be addressed, at least in part, via deployment of a centralized network controller (NC) and a modem wholesaling function in the access network. Benefits of such an approach include direct PSTN congestion relief; flexible tariffing of modem wholesaling services into ISPs, economy of scale through modem pooling to multiple ISPs; network based real-time control of services (ISP port limiting, ISP home gateway load balancing); real-time access to network-wide service information, call/event logs, and operational measurements; and centralized control for invocation of administrative state on access network elements. Although the related patent does allude to use of Common Channel Signalling System Number Seven (CCS7) based control of call setup into the NAS, Network Access Server, NAS specific details of how this approach functions were not addressed. Further, the related application does not address out-of-band call setup into the NAS via the existing PSTN CCS7 infrastructure. As well, an architecture for interworking a CCS7 controlling agent, network controller, and existing telecommunications networks for the purposes of services interworking was also not addressed.

Within the PSTN (hereafter including the ISDN), CCS7 provides a highly robust and reliable infrastructure for control of narrowband (up to 64 kbps) circuit-switched basic call setup and supplementary services (e.g., mobility, freephone, calling name/number display). For example, within North America the CCS7 specifications include T1.113.x for ISDN User Part Call Control Signalling, T1.112.x for Signalling Connection and Control Part (SCCP) connection-oriented and connectionless services, T1.111.x for Message Transfer Part network layer services and for link layer services. The CCS7 specifications also provide appropriate support for ISDN-based data services (restricted and unrestricted digital information) through specification of appropriate bearer services and ISDN information element handling. Thus, CCS7 can be employed within an ISDN to support a digital data service for IP-related services. However, the CCS7 specifications do not address procedures for IP-based data services and their interworking with the PSTN (e.g., address translation, information element mapping). An appropriate architecture is required to address this interworking issue.

Within Internet Protocol based data networks (both the internet and intranets (e.g., corporate networks)) and specifications, a variety of network access alternatives 35 are possible (e.g., PSTN-based dial-up access, private line, cable modem). For dial-up based access from the PSTN, a point-to-point modem protocol (e.g., Serial Line Interface Protocol (SLIP), Point-to-Point Protocol (PPP)) is used to establish a data path over the analog physical layer access. One placement of the network-side modem to terminate the point-to-point modem protocol is to provide a modem pool platform (NAS) accessed from the PSTN via an ISDN Primary Rate Interface (PRI) digital interface. PRI is a User Network Interface (UNI) supporting one in-band signalling channel and 23 bearer channels (i.e., 23 narrowband modem calls can be terminated within the modem pool platform for each PRI interface). This implementation has some shortcomings based upon concerns such as provisioning, tariffing, network ownership, and maintenance. Since PRI is a UNI, the point of interworking between the PSTN and modem termination is explicitly visible and the PSTN takes the role of an access user of the data network (i.e., via a UNI). This is inconvenient if the PSTN network provider is also providing the modem termination function. Further, the IP specifications also do not adequately address an architecture and procedures for IP-based data services and their interworking with the PSTN (e.g., address translation, information element mapping).

It is desirable to support an interworking between the PSTN and IP-based data networks in a transparent fashion based upon a Network-to-Network (NNI) interface. As explained above, the existing CCS7 and IP specifications do not adequately address a method and architecture through which to use the existing CCS7 infrastructure and traditional telephony NNI trunking interfaces (e.g., T1 trunks) to set up and control a data network (e.g., IP) call. It is also desirable to identify an appropriate architecture to enable further interworking between existing networks (PSTN, mobility networks (e.g., GSM)) and IP-based data networks for services interworking.

A flexible and efficient means to interwork the existing PSTN infrastructure with data networks for IP-related call control, and to interwork IP-based data networks with PSTN and other networks for services interworking, is desirable.

SUMMARY OF THE INVENTION

It is an object of the present invention to provide method of data call setup with interworking between the PSTN and IP-based data network.

The invention, therefore, according to a first aspect provides a method of interworking CCS7 call control messages in a virtual CCS7 data node and setting up appropriate resources to initiate incoming calls into the data network, comprising the steps of: predefining subset of CCS7 ISDN User Part (ISUP) messages required for controlling setup of a data network call, translating CCS7 call control messages into a set of primitives used by a network access server (NAS), checking the incoming primitives to authorize call origination, predefining a set of primitives to exchange with the Network Access server, exchanging primitives with the network access service for controlling setup of data network side transport resources, and establishing network access server control of transport links between the PSTN and data network.

The invention, according to a second aspect, provides a method of interworking CCS7 call control messages in a virtual CCS7 data node to terminate calls which were initiated into the data network, comprising the steps of: predefining a subset of CCS7 ISDN User Part (ISUP) messages required for controlling setup and teardown of a data network call, translating CCS7 call control messages into a set of primitives used by a network controller and network access server, predefining a set of primitives to exchange with the network access server, exchanging primitives with the network access server to control release of data network side transport resources, and updating network controller resident data structures to release the call.

According to another broad aspect, the present invention provides an architecture for interworking CCS7 initiated calls from the PSTN into data networks with services interworking into existing networks (e.g., GSM, AIN).

In a particular embodiment of this invention, an architecture provided in U.S. Pat. No. 5,610,910, the entire specification of which is hereby incorporated by reference, is employed together with a CCS7 interworking function, network controller, and Network Access Server (NAS). This specific architecture provides flexible call setup based upon interworking between the PSTN and IP-based data network while maintaining network based control. Further benefits of CCS7 connectivity include out-of-band control for call authorization prior to assigning NAS resources, enhanced failure condition handling, and enhanced services interworking.

Accordingly, the present invention provides interworking between the PSTN and IP-based data networks for flexible call setup, services interworking, and network-wide call management. Advantages of this invention include: use of industry standard CCS7 signalling requiring no changes to existing PSTN switches, support for network-wide data network call control, and management based upon the network controller; use of efficient and economical transport resources between the PSTN and IP-based data network; relief of congestion on PSTN trunks and switches terminating into data networks; economies of scale on data modem management and resources, and services interworking with other telecommunications networks.

BRIEF DESCRIPTION OF THE DRAWINGS

The present invention will be further understood from the following description of signalling and transport architecture with reference to the accompanying drawings, in which.

DETAILED DESCRIPTION

Figure 1:
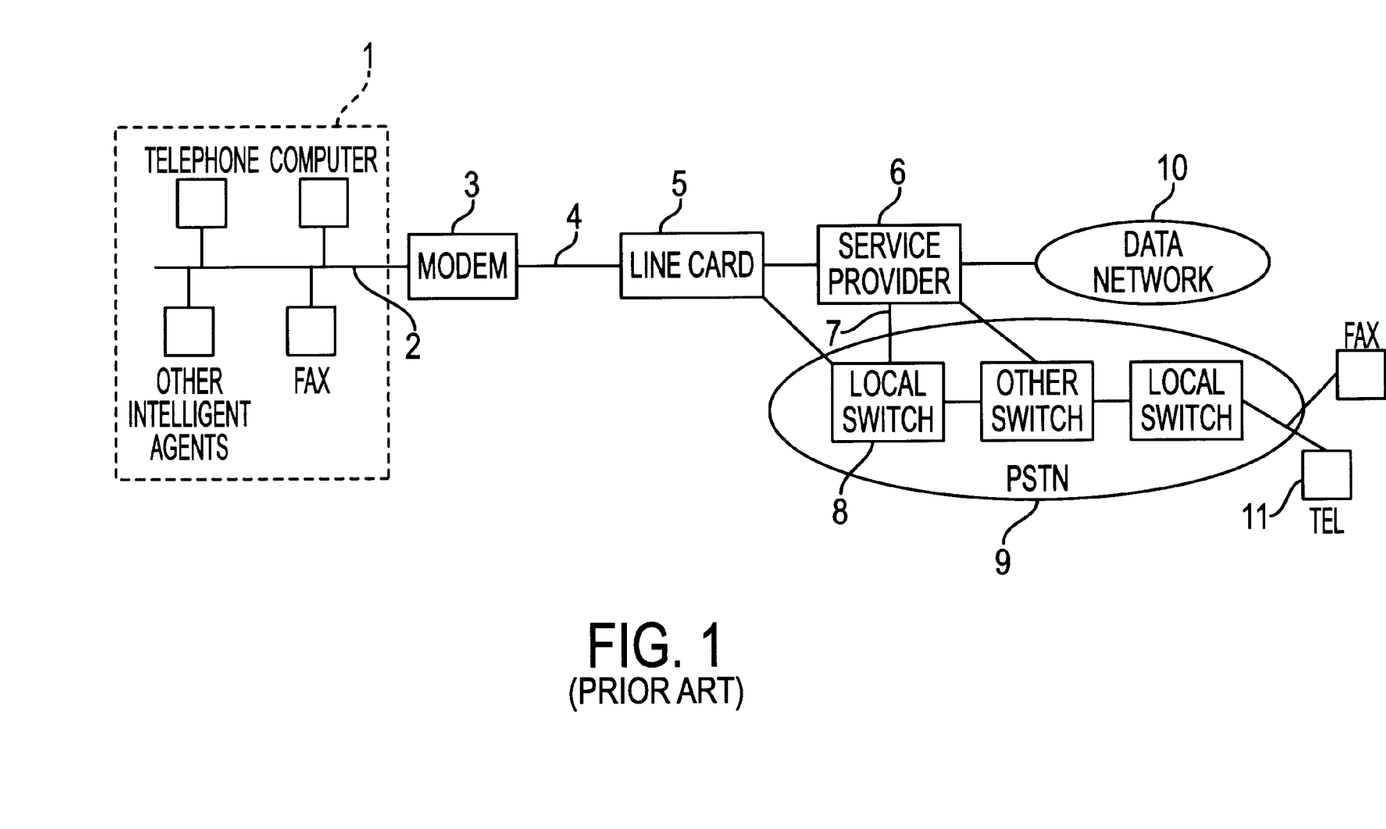
FIG. 1 illustrates a known network.

FIG. 1 from U.S. Pat. No. 5,610,910 shows how a telephone, fax, computer and other intelligent agents are typically connected through a PSTN and data network. Customer Premise Equipment (CPE) 1 is connected through inside wiring 2 at the customer premise to a modem 3 and then through the feeder/distribution plant (also called subscriber's loop, local access loop) 4 to an access module (e.g., linecard) 5. The linecard is in turn connected to a local switch 8 that is part of the Public Switched Telephone Network (PSTN). The PSTN operates in a channelized mode. For connections involving a data network, the CPE (e.g., computer) 1 also requires a telephone subscriber's loop to the PSTN by dialup service which connects to a data service provider 6 through its own subscriber loop 7. The data service provider 6 then provides a data connection through a data network 10 to the appropriate data service or other data service subscriber. Typically, computer connections are much longer in duration than voice or other (e.g., FAX) connections. Since the PSTN was engineered to handle typical call holding times of three or four minutes, it is beneficial to move data network calls off of the PSTN at points of congestion (e.g., access and trunk interfaces).

Figure 2:
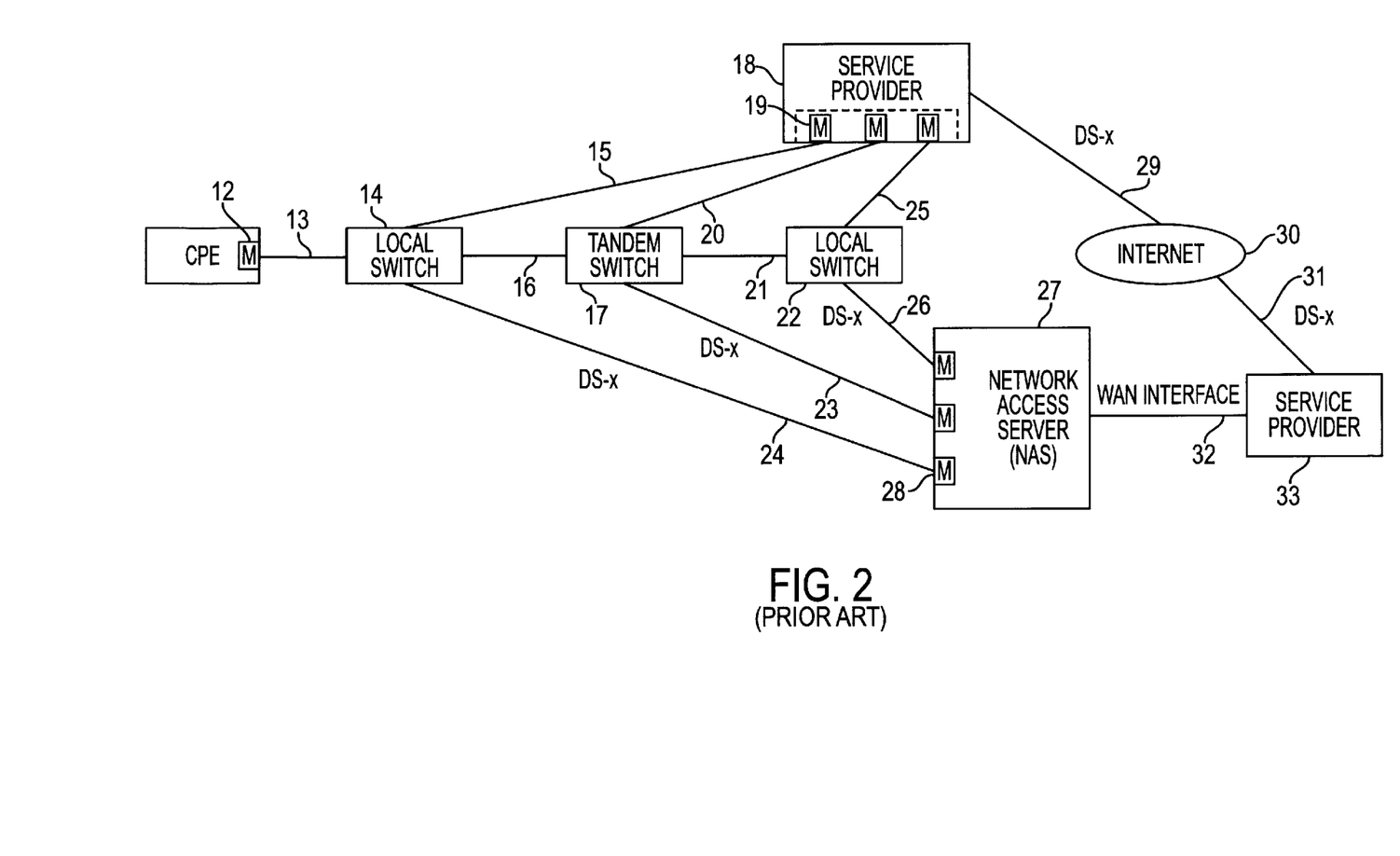
FIG. 2 illustrates two known data network access architectures.

FIG. 2 adapted from U.S. Pat. No. 5,610,910 shows two primary methods through which data networks such as "Internet" are accessed through PSTN network trunks for end users. An individual end user subscribes to the service of a commercial network service provider 18, 33. Access to the data network is by dialing the (e.g., E.164) telephone number of the commercial data network provider using a modem in the CPE 12. Thus, the end user CPE uses a modem and makes a dialup connection to a local switch 14 via a subscriber's loop 13.

In the first primary method, the commercial service provider 18 owns and maintains a pool of modems 19. Three scenarios are possible:

(1) The local switch 14 makes a connection through a local loop or trunk interface 15 to the service provider terminating modem 19;

(2) The local switch makes a connection through a trunk interface 16 to a tandem switch 17. The tandem switch 17 makes a connection through a local loop or trunk 20 to the service provider terminating modem 19;

(3) The tandem switch 17 makes a connection through a trunk interface 21 to a terminating local switch 22. The terminating local switch 22 makes a connection through a local loop or trunk 25 to the service provider terminating modem 19.

In the second primary method, the commercial service provider 33 makes use of a Network Access Server (NAS) 27 which terminates end-user modem traffic. The NAS 27 contains the Digital Signal Processing circuitry (not shown) required for the support of analog modem calls, as well as the HDLC and signalling processor (also not shown) required for ISDN data call support. The NAS 27 also supports end-user authentication schemes such as PAP, CHAP, and RADIUS; link-layer protocol processing such as Serial Link Interface Protocol (SLIP), Point-to-point protocol (PPP); tunnelling protocol such as Layer 2 Forwarding (L2F), Layer 2 tunnelling protocol (L2TP); and, data networking protocols such as Transport Control Protocol (TCP), User Datagram Protocol (UDP), Internet Protocol (IP); as well as link-layer protocols such as Ethernet, Frame Relay, X.25, or Asynchronous Transfer Mode (ATM). The NAS 27 connects to the Service Provider 33 via a data network (e.g., WAN interface) 32 using protocols such as Ethernet, Token Ring, Fiber Distributed Data Interface (FDDI), Frame Relay, or ATM.

As for the first primary method, for the second primary method there are three scenarios possible in which either an originating local switch trunk 24, tandem switch trunk 23, or terminating local switch trunk 26 is used to terminate traffic onto the NAS 27 (e.g., terminating modems 28).

In both primary scenarios, the service provider 18, 33 will then provide an interface 29, 31 to the internet 30 via, for example, DS-1 or DS-3 trunks.

As taught in U.S. Pat. No. 5,610,910, use of the PSTN by data network service users increases usage of the telephone network enormously without a proportionate increase of additional revenues to the PSTN provider. While U.S. Pat. No. 5,610,910 sought to reduce investment in the PSTN for support of data services via a multi-service access technique based upon, in part, an encapsulation of data and signalling information between the CPE and an access module, a corresponding technique for addressing efficient network-side trunking was not addressed.

Figure 3:
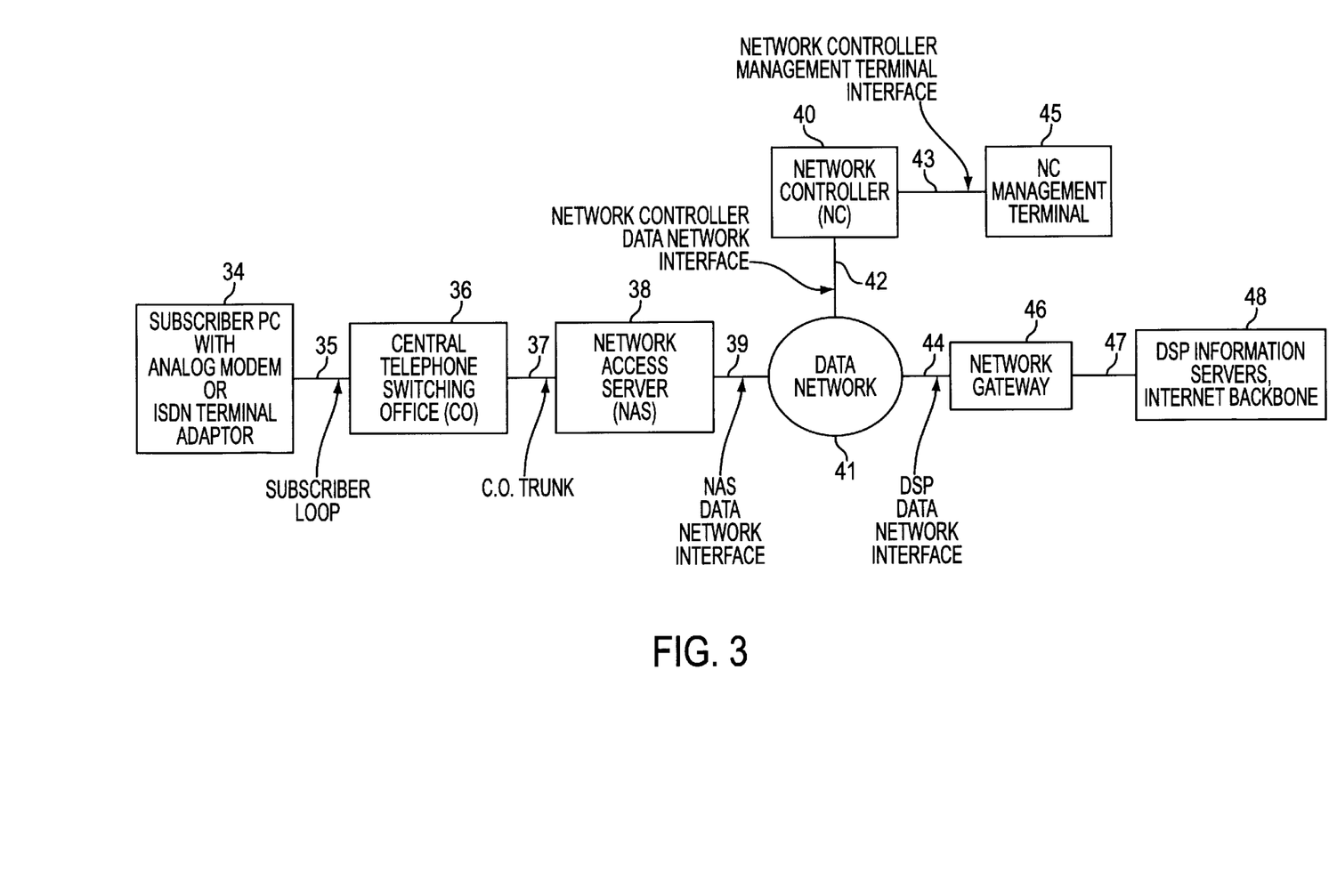
FIG. 3 illustrates a functional architecture for an Internet Protocol data call control server.

Referring to FIG. 3 there is illustrated a functional architecture, based upon a related patent application for an internet protocol data call control server referenced hereinabove. A network controller 40 performs functions to ensure high quality of the data access transport service for data service providers 48. In one embodiment of the network controller 40, a data network interface 39, 41, 42 is employed between the data network access server (NAS) 38 and network controller 40 in establishing data calls into the DSP information providers and internet backbone 48. This embodiment does not make use of a standard PSTN CCS7 based interface for call control purposes.

Figure 4:
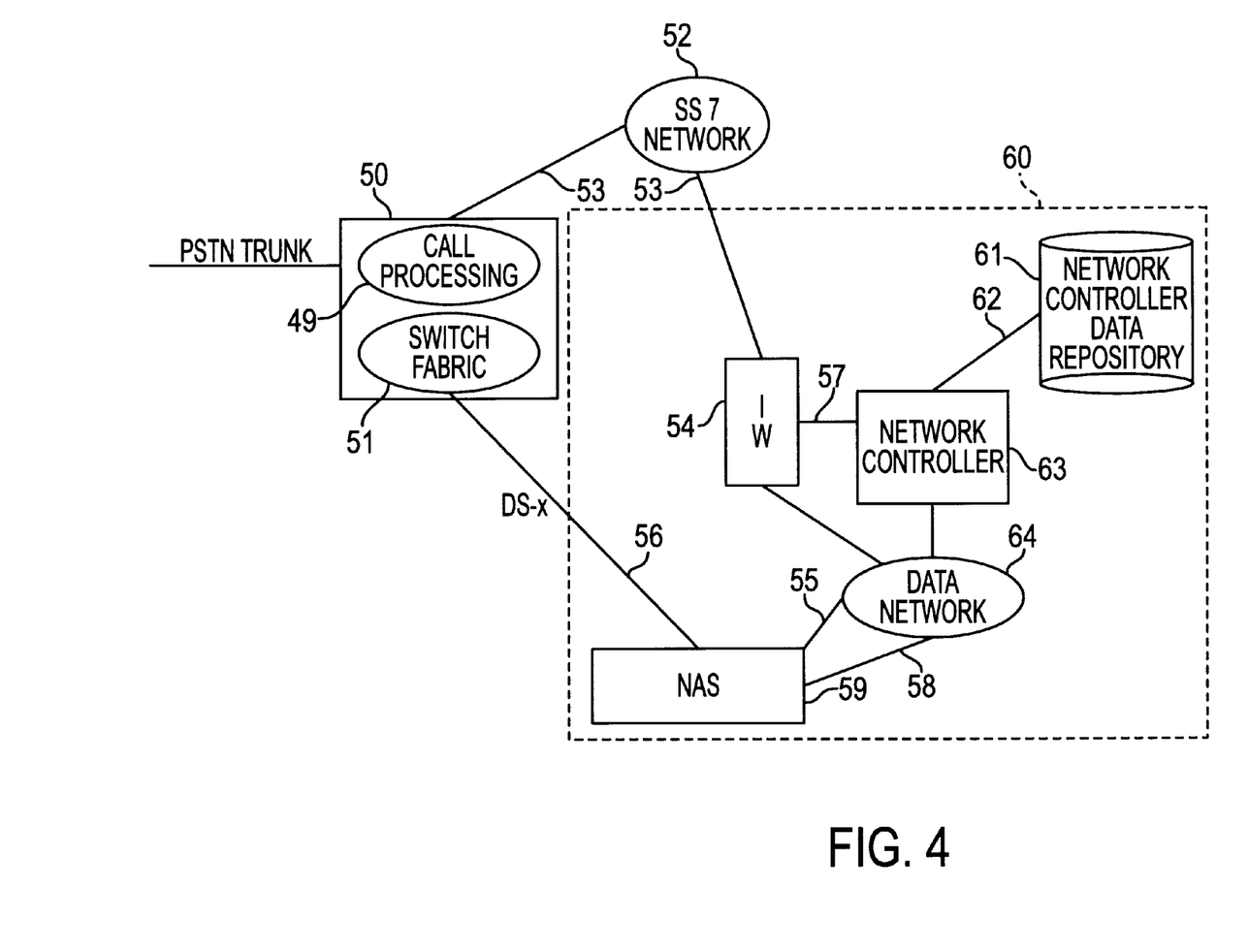
FIG. 4 illustrates an architecture for a virtual CCS7 data node and PSTN to IP data network interworking function in accordance with an embodiment of the present invention.

Referring to FIG. 4, there is illustrated an architecture for the virtual CCS7 signalling node. The virtual CCS7 signalling node 60 is connected to the public switched telephone network (PSTN) via a PSTN switch 50 and an SS7 network 52. The PSTN switch 50 includes call processing 49 and a switch fabric 51. The virtual CCS7 signalling node 60 includes an interworking function 54, a network access server (NAS) 59, a network controller 63, network controller data repository 61 and is connected to the data network 64. The interworking function 54 couples the network controller 63 and the data network 64 to the SS7 network 52. The architecture for a virtual CCS7 signalling node 60 which provides appropriate functionality for interworking with a PSTN switch 50 for the purposes of completing data calls to the data network 64. As a consequence of normal PSTN call processing 49, a channel is assigned by the PSTN switch 50 through the switch fabric 51 and on the outgoing trunk 56 and a call initiation attempt is launched to the virtual CCS7 signalling node 60 through the CCS7 signalling network 53. The interface to the virtual CCS7 signalling node is through standard ISDN User Part (ISUP) call control signalling links 53. When a call setup message is received by the virtual CCS7 signalling node interworking function 54, appropriate processing is performed to parse the message and translate into a form 57 suitable for further enhanced service processing by the network controller 63, if required. Alternatively, the virtual CCS7 signalling node interworking function 54 translates the message into a form 55 appropriate for basic call processing by the NAS 59: the NAS 59 then performs basic call control processing. Conceptually, two control paths exist within the virtual CCS7 signalling node 60 to the NAS 59. The path 55 between the interworking function 54 and NAS 59 handles call setup and other signalling primitives, while the path 58 between the network controller 63 and NAS 59 handles enhanced service processing, including configuration management and maintenance of signalling resources. The precise allocation of functionality to the interworking function 54 and network controller 63 depends upon considerations such as real-time performance (e.g., call control through the CCS7 network 52 and interworking function 54 is real-time critical). Thus, the dialogue between the NAS 59 and interworking function 54, respectively NAS 59 and network controller 63, is also determined by such considerations.

The interface 57 between the interworking function 54 and network controller 63 is internal if the interworking function 54 and network controller 63 are implemented on the same platform, external otherwise. The network controller 63 performs processing on the parsed message 57 through referencing and updating the network controller data repository 61. The interface 62 between the network controller 63 and network controller data repository 61 is internal if the network controller 63 and network controller data repository 61 are implemented on the same platform, external otherwise. The call may be terminated by the interworking function 54 as a result of the communications between the interworking function 54 and the network controller 63. For example, if a pre-determined port count limit is exceeded, reject the call early at the CCS7 interworking function 54 without involving the NAS 59. If as a result of enhanced service processing the network controller 63 determines that the incoming call is to be completed, an appropriate primitive is transmitted through the data network 55, 58 to the NAS 59. In an optional configuration in which the network controller 63 or CCS7 interworking function 54 and NAS 59 are on the same platform, the interface between them is internal and does not make use of the data network 64. Upon receipt of a call handling or enhanced service primitive 55, 58, the NAS 59 performs appropriate processing to service the primitive. For call setup, if data call handling resources are available, appropriate NAS processing occurs to assign a channel on the incoming transport trunk 56 and respond to the interworking function 54 or network controller 63 with a response 55, 58 identifying the resources used. If data call handling resources are not available, a response 55, 58 is returned to the interworking function 54 or network controller 63 indicating the cause for the failure (e.g., insufficient resources available).

This embodiment provides an efficient means for handling data call setup initiated from Public Switched Telephony networks through making use of the existing PSTN CCS7 signalling capability. Key benefits include efficient congestion relief for IP-related calls in the PSTN, reduced need for building out the PSTN network through integrated modem capabilities controlled via CCS7, use of industry standard CCS7 signalling, use of the most efficient and economical transport resources between the PSTN and IP-based data network, establishment of a clear evolution path for services interworking based upon incoming CCS7 signalling agents (see FIG. 7) and relief of congestion on PSTN trunks and switches terminating into data networks.

Figure 5:
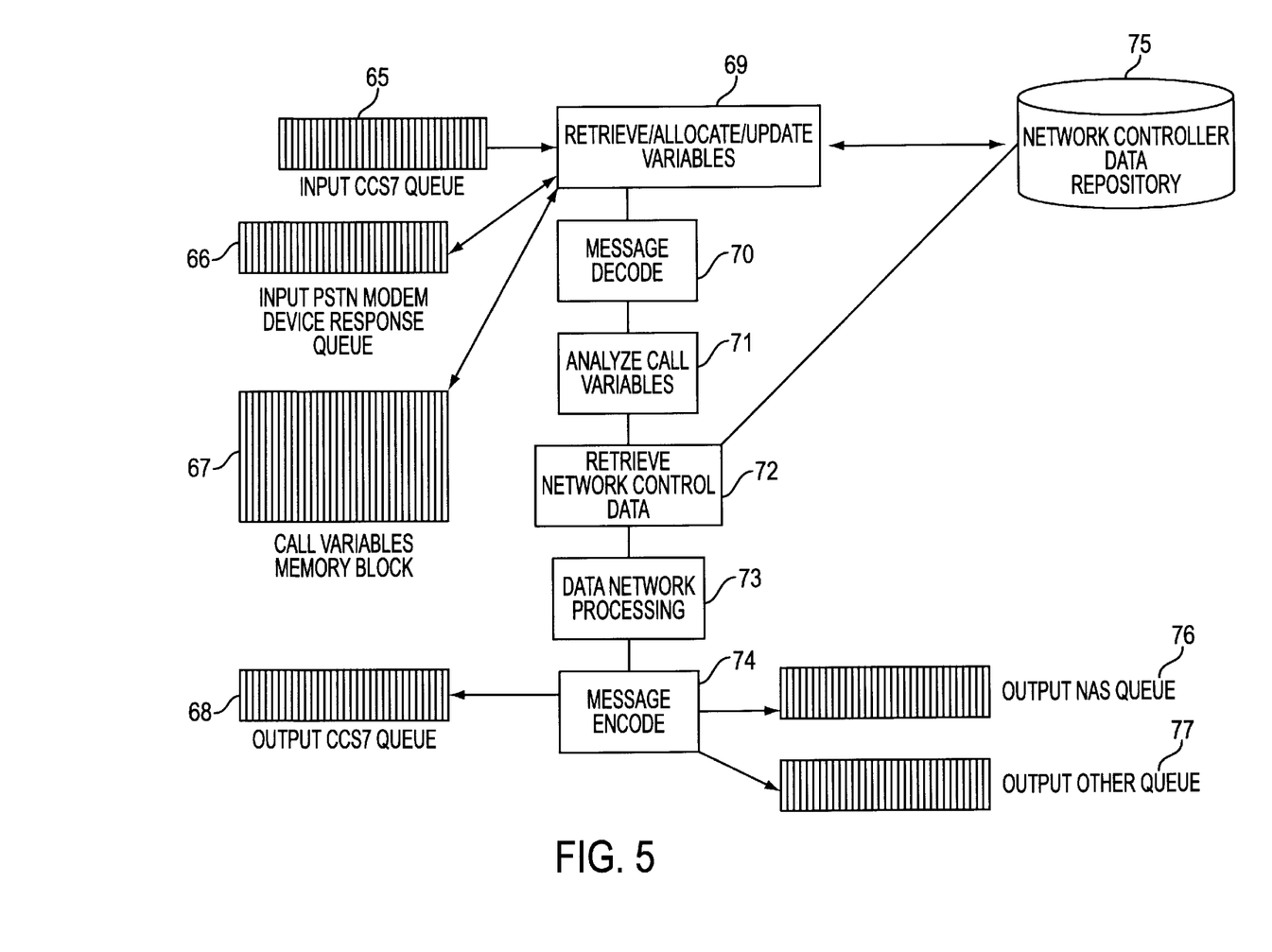
FIG. 5 illustrates a first embodiment of high level functional breakdown of virtual CCS7 signalling node interworking for the virtual CCS7 data node of FIG. 4.

Referring to FIG. 5, a detailed breakdown of the CCS7 interworking node is illustrated. The interworking node includes several functions used to process an incoming call setup request from the PSTN and to invoke a variety of services. In the configuration shown, a set of functions for handling enhanced services processing within the interworking function are shown 72, 73. Alternative implementations are possible. On receipt of an incoming CCS7 message 65, a block of memory 67 is either allocated or retrieved 69 depending upon whether the incoming message is associated with an existing call and whether the particular CCS7 interworking node implementation calls for statefull or non-state associated processing configuration (this is further explained with reference to FIG. 6). The call variables memory block 67 is used to store all variables required during execution of message and service processing. Once the call variables memory block 67 has been allocated 69, a message decode function 70 is invoked to parse the message and store the call variables 67. The message decode function may make use of protocol conversion references stored in the network controller data repository 75. Based upon analysis 71 of the call variables 67, the network controller data repository 75 is optionally accessed, depending upon the distribution and implementation of functions between the interworking function and network controller, by a retrieval function 72 to obtain data appropriate for processing the call instance. This data is also stored in the call variables memory block 67. A data network processing function 73 then accesses the call variables 67 to perform a variety of call/service processing functions. As explained in the related U.S. patent application referenced hereinabove, these centralized data access transport services can include centralized port limiting, ISP home gateway load balancing, and multi-link point-to-point protocol. After data network processing 73, the CCS7 interworking function will invoke a message encode function 74 to send a message appropriate for the results of the data network processing function. In the simplest configuration, the CCS7 interworking function provides the basic capability for call setup and services processing between the incoming PSTN signalling link and NAS. If a response is to be sent to the originating PSTN voice switch, then the message encode 74 will put an appropriate response in the output CCS7 queue 68. If a command for modem control is to be sent to the NAS, then the message encode 74 will put an appropriate response in the output NAS queue 76.

In an optional configuration, the CCS7 interworking function also provides functions for interworking with other networks. For example, an incoming CCS7 message may attempt a call setup to a data network by entering a freephone (e.g., 800 number in U.S. networks) number. In order to process the freephone number, a query to a PSTN CCS7 resident freephone database is required to resolve the actual called party number. In this case, the message encode function 74 composes the appropriate query and puts it on the output CCS7 queue 68. Another example configuration enables enhanced call processing via access to a data network resident server. In this case, the data network processing function 73 may determine based upon the call variables 67 that a TCP/IP resident server needs to be accessed for outgoing call authorization based upon called party number and time of day. Here, the message encode function will compose an appropriate query and put it on the output 'other' queue 77 (in this case, a TCP/IP queue outgoing over an appropriate WAN (e.g., Frame Relay, ATM) interface).

Figure 6:
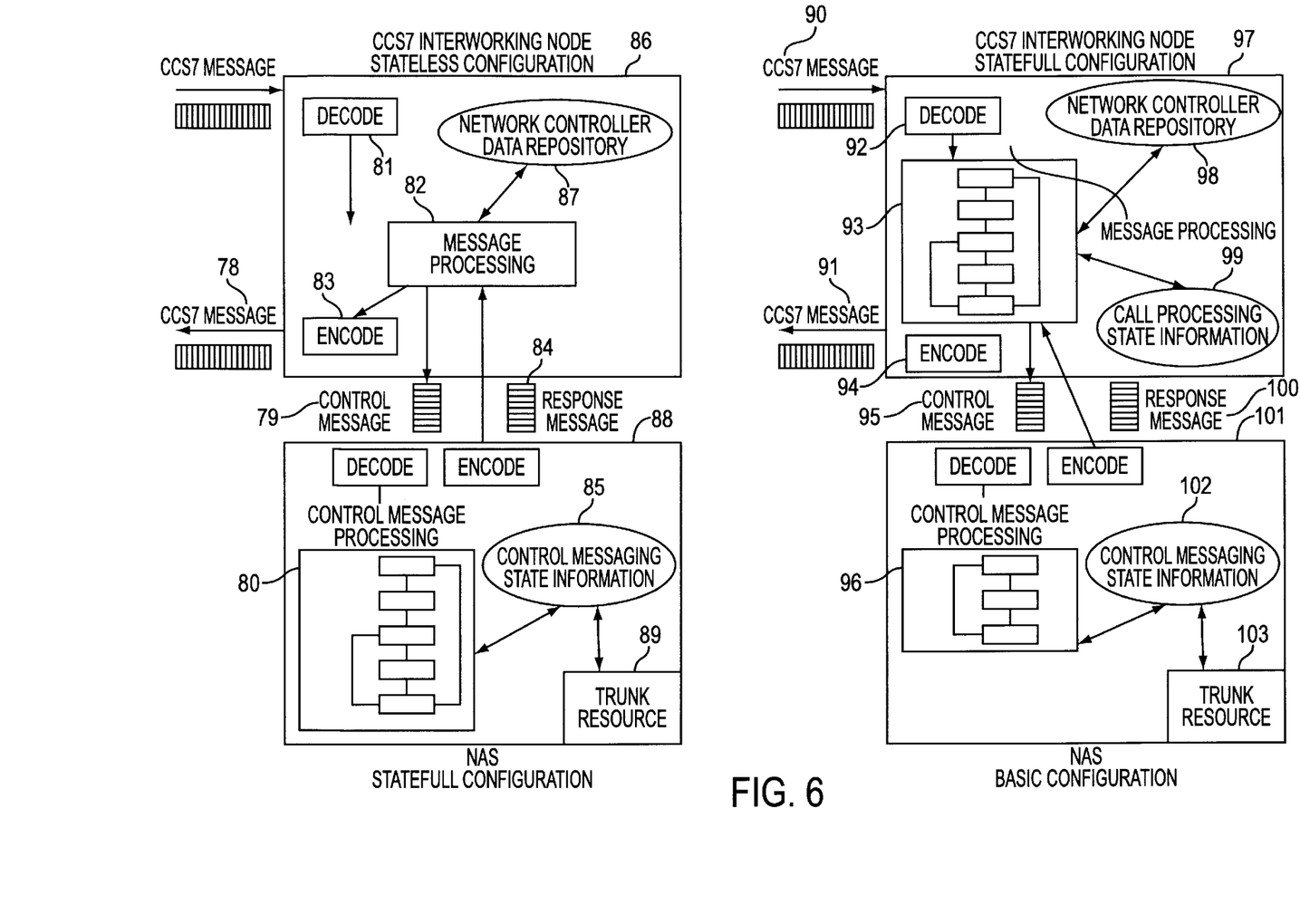
FIG. 6 illustrates a second embodiment of a detailed optional configurations for the CCS7 signalling node interworking function.

Referring now to FIG. 6, a set of two optional configurations of the CCS7 interworking node and NAS are shown. As explained earlier, other optional configurations of the interworking function are also possible depending upon the distribution of functions between the CCS7 interworking function and network controller. In a CCS7 interworking node with a stateless configuration 86, the message processing function 82 will optionally access the network controller data repository 87 in support of advanced services as specified above. Using the results of the decode function 81 and network controller data 87, the message processing function 82 will make an appropriate call control decision and either send a control message 79 to the NAS 88 or send directly a CCS7 response message 83, 78. The message processing function 82 may update the network controller data repository 87 to update whatever data is required to support the advanced network based services. However, the network controller data repository 87 does not contain any data specific to a call instance. Specifically, the message processing function 82 does not contain any state information related to the call.

In a NAS with a statefull configuration 88, the control message processing function 80 models and maintains a set of states for controlling setup and teardown of the call. The control message state information 85 must therefore be stored and maintained for the life of the data network call. The set of states need to maintain sufficient information such that appropriate response messages 84 can be sent back to the CCS7 Interworking node 86. The appropriate response message 84 will be sent to reflect the call state and status of trunk resource 89 used for the call.

Conceptually, the CCS7 Interworking node with stateless configuration 86 contains less intelligence and call processing capabilities than the CCS7 Interworking node statefull configuration 97.

As with the stateless configuration 86, in the statefull configuration 97 the message processing function 93 will optionally access the network controller data repository 98 in support of advanced services as specified above. Using the results of the decode function 92, network controller data 98, and call processing state information 99, the message processing function 93 will make an appropriate call control decision and either send a control message 95 to the NAS 101 or send directly a CCS7 response message 94, 91. The message processing function may update the network controller data repository 98 to update whatever data is required to support the advanced network based services. In this case, the network controller data repository 98 may contain data specific to a call instance. Optionally, a separate call processing state information repository function 99 may be employed to maintain the call state information. Here, the message processing function 93 does make use of state information related to the call.

In a NAS with a basic configuration 101, the control message processing function 96 models and maintains a basic set of states 102 for controlling and managing the trunk resource 103. The set of states need to maintain sufficient information such that appropriate response messages 100 can be sent back to the CCS7 Interworking node 97. The appropriate response message 100 will be sent to reflect the (call) status of trunk resource 103 used for the call.

Conceptually, the CCS7 Interworking node with statefull configuration 97 contains more intelligence and call processing capabilities than the CCS7 Interworking node stateless configuration 86. Also, in this case the NAS basic configuration 101 maintains a corresponding lower degree of call processing intelligence.

Figure 7:
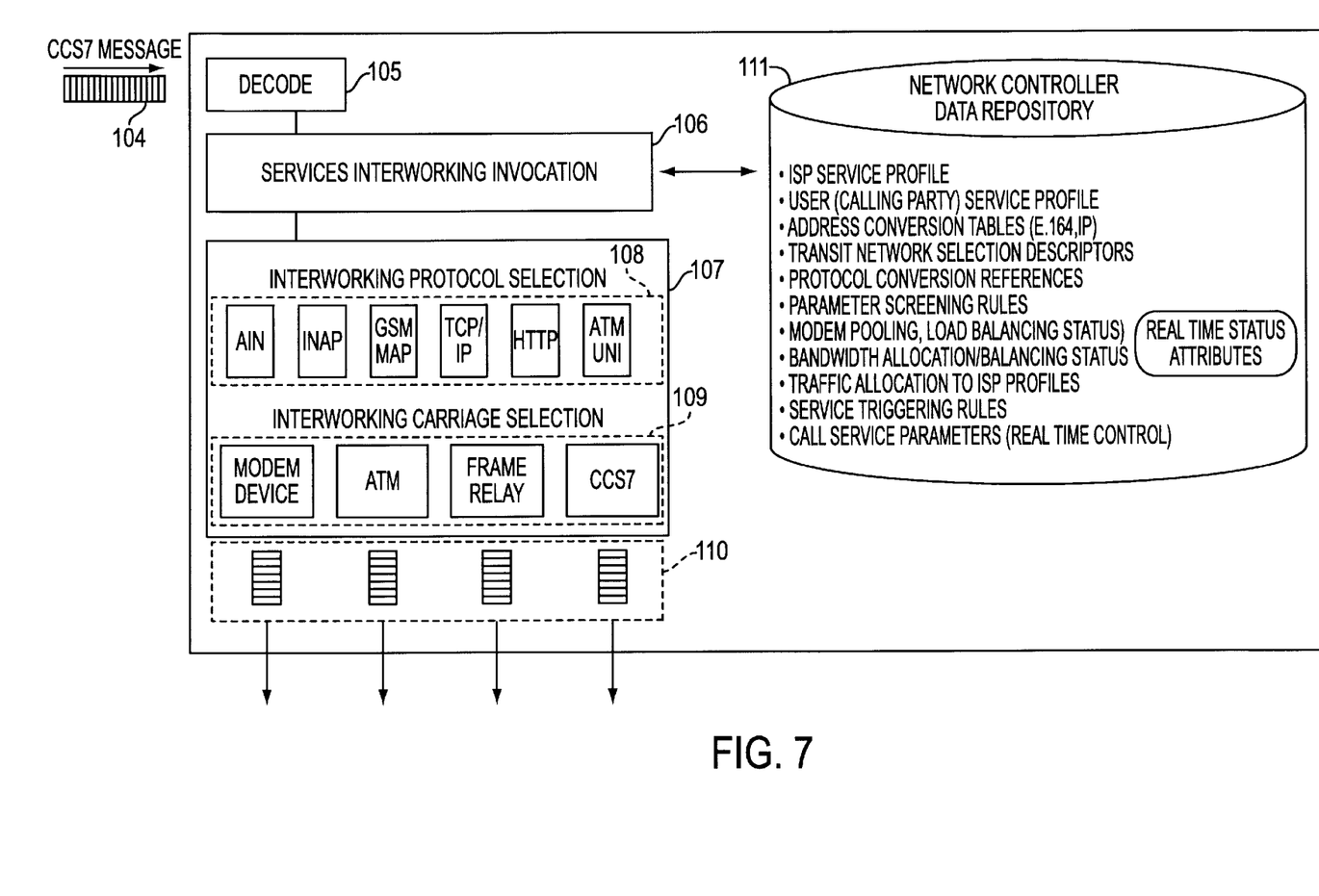
FIG. 7 illustrates a functional model for the general CCS7 interworking node services and network interworking capability for the virtual CCS7 data node of FIG. 4.

Referring now to FIG. 7, a representation of the general CCS7 interworking node functional capabilities is presented: either a statefull or non-statefull implementation is possible. The incoming CCS7 message 104 goes through the normal decoding process 105 (this would include update of message store variables for handling this message (not shown)). Based upon the incoming message variables, the service interworking invocation function 106 optionally accesses additional information from the network controller data repository 111 and performs the required service processing. As a result of the service processing, if interworking is determined to be required to, for example, an existing network, then an interworking protocol function 107 performs the necessary protocol selection/translations 108 and carriage (i.e., transmission medium) selection 109. The protocol data unit is then put onto the appropriate output queue 110. As an example, the incoming CCS7 message may specify connection to a given Internet Service Provider (ISP) based upon E.164 Called Party Number. As a result of services interworking invocation 106 and access to the network controller data repository 111, it may be determined that the ISPs Time of Day (TOD) controller needs to be accessed before the call can be offered to a modem device. An appropriate query would be constructed by the service interworking invocation function 106 to provide to the TOD controller the current number of active users from a given access network. This information could be packaged into a TCP/IP query over a Frame Relay connection into the ISP TOD controller. The TOD controller may specify to proceed with the call, in which case the service interworking function can proceed with invocation of call setup (i.e., via a stateless or statefull capability in the interworking node). A minimal configuration for the CCS7 interworking node includes TCP/IP based control interfaces into the NAS (LAN or WAN based), CCS7 link interfaces, and WAN (e.g., Frame Relay) interfaces into data networks (e.g., TCP/IP based intranets). The architecture is such that additional control interfaces (e.g., AIN) and connectivity interfaces (e.g., ATM) can be added in a modular fashion.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

What is claimed is:

1. A method of interworking Common Channel Signalling System Number 7 (CCS7) call control messages in a virtual CCS7 data node and setting up appropriate resources to initiate incoming calls into a data network, comprising the steps of:

predefining a subset of CCS7 Integrated Services Digital Network (ISDN) User Part (ISUP) messages required for controlling setup of a data network call;

translating CCS7 call control messages into a set of primitives used by a network access server (NAS) and checking said set of primitives to authorize call origination;

predefining a set of primitives to exchange with the NAS;

exchanging primitives with the NAS for controlling setup of data network side transport resources; and establishing NAS control of transport links between a public switched telephone network (PSTN) and said data network.

2. A method as claimed in claim 1 further comprising the step of updating data structures resident in a network controller for managing an incoming call.

3. A method as claimed in claim 1 wherein the step of translating into a set of primitives includes primitives used by a network controller.

4. A method of interworking Common Channel Signalling System Number 7 (CCS7) call control messages in a virtual CCS7 data node to terminate calls which were initiated into a data network, comprising the steps of:

predefining a subset of CCS7 Integrated Services Digital Network (ISDN) User Part (ISUP) messages required for controlling setup and teardown of a data network call;

translating CCS7 call control messages into a set of primitives used by a network controller and network access server;

predefining a second set of primitives to exchange with the network access server;

exchanging said second set of primitives with the network access server to control release of data network side transport resources; and updating network controller resident data structures to release the call.

5. A method as claimed in claim 4 including the step of exchanging primitives between the network controller and the network access server to enable enhanced service processing.

6. A method as claimed in claim 5 wherein the enhanced service processing includes configuration management.

7. A method as claimed in claim 5 wherein the enhanced service processing includes maintenance of signalling resources.

8. An architecture for interworking a public switched telephone network and a data network comprising:

a data network having a network controller and a network access server; and a means for interworking the public switched telephone network and the data network, said interworking means coupled to the network controller, the data network and a signalling system associated with the public switched telephone network, said interworking means effecting connection from the public switched telephone network to the data network using the signalling system.

9. An architecture as claimed in claim 8 wherein the means for interworking includes means for decoding signalling system messages.

10. An architecture as claimed in claim 8 wherein the means for interworking includes means for encoding signalling system messages.

11. An architecture as claimed in claim 8 wherein the means for interworking includes means for exchanging data with the network controller.

12. An architecture as claimed in claim 8 wherein the means for interworking includes an interworking protocol function.

13. An architecture as claimed in claim 12 wherein the interworking protocol function includes an interworking protocol selection and an interworking carriage selection.

14. An architecture as claimed in claim 12 wherein the interworking carriage selection includes output queues.

15. A method of interworking Common Channel Signalling System Number 7 (CCS7) call control messages in a virtual CCS7 data node and setting up appropriate resources to initiate incoming calls into a data network, comprising the steps of:

predefining a subset of CCS7 Integrated Services Digital Network (ISDN) User Part (ISUP) messages required for controlling setup of a data network call;

translating CCS7 call control messages into a set of primitives used by a network controller checking said set of primitives to authorize call origination;

predefining a set of primitives to exchange with the network controller;

exchanging primitives with the network controller for controlling setup of data network side transport resources; and establishing network control of transport links between a public switched telephone network (PSTN) and said data network.

16. A method as claimed in claim 15 wherein the virtual CCS7 data node includes an interworking protocol function.

17. A method as claimed in claim 16 wherein the interworking protocol function includes an interworking protocol selection and interworking carriage selection.

18. A method as claimed in claim 17 wherein the interworking carriage selection includes output queues.

19. An architecture for interworking a public switched telephone network and a data network comprising:

a data network having a network controller and a network access server; and a means for interworking the public switched telephone network and the data network, said interworking means coupled to the network controller, the data network and a signalling system associated with the public switched telephone network, said interworking means effecting connection from the public switched telephone network to the data network using the signalling system;

and wherein a first control path exists from the network controller to the network access server for handling enhanced service processing, and a second control path exists from the interworking means to the network access server for handling signalling primitives.

* * * * *